United States Patent Office 3,122,528
Patented Feb. 25, 1964

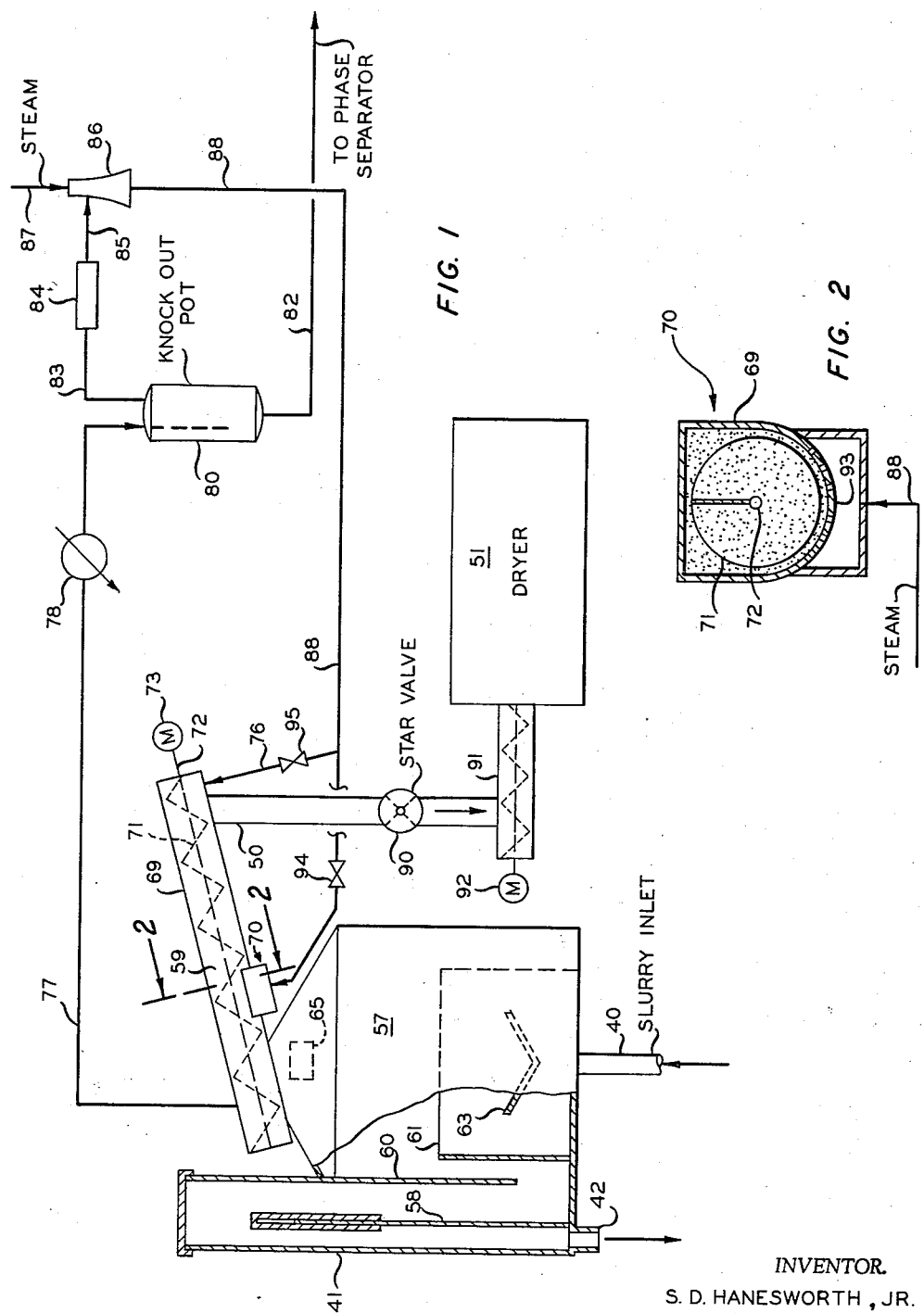
Feb. 25, 1964 — S. D. HANESWORTH, JR — 3,122,528
RECOVERY OF VOLATILE MATERIALS FROM FLOTABLE SOLIDS
Filed Jan. 31, 1962
INVENTOR.
S. D. HANESWORTH, JR.

3,122,528
RECOVERY OF VOLATILE MATERIALS FROM FLOTABLE SOLIDS
Stanley D. Hanesworth, Jr., Pasadena, Tex., assignor to Phillips Petroleum Company, a corporation of Delaware
Filed Jan. 31, 1962, Ser. No. 170,215
3 Claims. (Cl. 260—94.9)

This invention relates to the recovery of volatile materials from flotable solids.

As used herein the term "flotable solids" is intended to mean solids which are capable of being separated from liquid by flotation.

In many processes in which finely divided solids are handled, it becomes necessary to separate the solids from a liquid. An example is in the preparation of solid polymers such as polymers of olefins. In certain methods of preparing solid olefin polymers, the reaction product is obtained as a solution of polymer in a solvent or diluent material. Since the major uses of the polymer require a solid product, it is desirable that the polymer be separated from the solvent material, such as by precipitation methods. In one method, a slurry of precipitated polymer in solvent is provided by spraying a solution of polymer into liquid water whereby the polymer is dispersed in the water as particles and removed from the solution. This operation is carried out by combining the water at a temperature between about 60° F. and about 110° F. with a polymer solution having temperature between about 350° F. and about 200° F. to provide a mixture of polymer, water and solvent having a temperature between about 110° F. and about 150° F. Usually the amount of water required is between 1 and about 5 lbs./lb. of polymer solution. Sufficient pressure is required during the process to maintain the solvent and water in liquid state. After the precipitation step the polymer is present in a sub-divided solid form, mixed with water and solvent. A major portion of the solvent can be removed by stripping; however, the problem still remains of separating the water whereby a dry polymer product can be obtained.

In Patent 2,955,714 a method and apparatus are described for removing a flotable solid from a skim tank by means of an auger, that is, a solid-liquid mixture is raised upwardly along an inclined surface while simultaneously providing a degree of agitation and tumbling of the solids. In one embodiment of that invention the solids-liquid mixture to be separated is introduced to a skimming tank superposed by an inclined auger, which at its end of lower elevation is in open communication with the skimming tank. The skimming tank is carried liquid full whereby all of the solids introduced thereto are readily taken up by the auger and are discharged at the end of high elevation. Due to the density of the solids, the elevation of the auger and the tumbling effect provided during passage of the solids through the auger, the concentration of solids in the mixture leaving the auger is substantially increased. As desired additional drying can be provided by discharging the concentrated solids mixture to a secondary dryer, such as for example, a rotary steam dryer, air dryer, etc.

While the above described method aids materially in removing excess liquid from the solids, in those systems wherein a slurry of solids in a low boiling liquid such as polymer in hydrocarbon are first steam stripped prior to being passed to the skim tank, a small amount of said low boiling material remains with the solids, the amount being somewhat dependent upon the temperature of the stripping zone. Frequently the stripping zone is limited as to the maximum temperature such as for example the softening point or decomposition temperature of the solids, steam temperature and the like. These low boiling materials are frequently hazardous to health and are fire hazards in conventional drying equipment. For that reason, it is often desirable to reduce the concentration of such materials to a minimum. It is also desirable to remove these materials prior to the final drying step to aid in the recovery of these materials and to reduce the load on the dryer. The use of an inert stripping gas is disclosed in Patent 2,957,861 and such a process greatly improves the recovery of the low boiling hydrocarbon. However, we have continued to search for further improvements.

It is an object of this invention to provide a method of removing additional liquid from solids in an auger.

It is another object of this invention to provide a method of removing residual low boiling materials from solids recovered from a skim tank by means of an auger.

It is still another object of this invention to remove residual hydrocarbon from a polyolefin recovered from hydrocarbon slurry by steam stripping.

Still other objects, features and advantages of this invention will be obvious to those skilled in the art having been given this disclosure.

Broadly, my invention resides in a process wherein flotable solids are skimmed from a slurry of said solids in a liquid comprising a low boiling component, conveyed up an inclined surface, and contacted with an inert stripping gas introduced at the upper end portion of said inclined surface, said gas removed at the lower end portion of said inclined surface, the improvement comprising introducing a second portion of said stripping gas at a point between the inert gas introduction and removal, the amount of said second portion of inert gas being sufficient to fluidize said solids being conveyed up said inclined plane. Steam is the preferred stripping gas.

The disclosure includes a drawing comprising:

FIGURE 1, a schematic diagram showing the polymer skimming operation with subsequent steam stripping of polymer solids, and FIGURE 2, a cross section view on line 2—2 of FIGURE 1.

The invention will be described in conjunction with an olefin polymerization process and recovery system, however, this is not intended in any way to limit the scope of the invention which includes the reduction of low boiling content from solids in general.

Solid olefin polymers are prepared usually by contacting the olefin to be polymerized with a catalyst at an elevated temperature and pressure, often in the presence of a solvent or diluent material. The reaction product can be one of a wide variety of olefin polymers, such as, for example, polymers or copolymer of monoolefins like ethylene, propylene, butylene, etc., also copolymers of these monoolefins and diolefins such as butadiene, isoprene, etc.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is often maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. When utilizing a fixed catalyst bed, the space velocity varies from as low as about 0.1 to about 20 volumes of feed per volume of catalyst per hour, with the preferred range between about 1 and 6 volumes per volume per hour. The polymerization process can also be carried out in the presence of a mobile catalyst. In this type of operation the catalyst concentration in the reaction zone is maintained between about 0.01 and about 10 percent by weight and the residence time is from 10 minutes or less to 10 hours or more.

A preferred polymerization method is described in detail in Patent No. 2,825,721. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example an acyclic or alicyclic, or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity, usually greater than 90% at normal atmospheric temperatures.

Other procedures which employ different catalysts are also used for preparing olefin polymers. For example, polymers are prepared in the presence of organo-metallic compounds such as triethyl aluminum plus titanium tetrachloride, mixtures of ethylaluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metals from the group consisting of sodium, potassium, lithium, rubidium, zinc, cadmium and aluminum.

The solvent or diluent employed in the polymerization reaction includes in general, paraffins which can at least partially dissolve the polymers at the temperature employed in the reaction zone. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are also used; however, in some instances they (or impurities therein) tend to shorten the catalyst life, therefore, their use will depend on catalyst life. All of the foregoing and in addition other hydrocarbon diluents which are relatively inert and in the liquid state at the reaction conditions may also be employed in carrying out the reaction of olefins to form solid polymers.

The present process represents an improvement upon the system of Patent 2,957,861 which shows the basic process. It can also be used with the system of Bell et al. Serial No. 769,917, filed October 27, 1958, wherein losses of solvent vapor and inert gas are reduced by recycling them to the stripping zone. Further details are available in these references. The improvement is obtained by fluidizing the polymer particles in a portion of the auger. This is preferably done near the polymer inlet end of the auger.

Referring now to FIGURE 1, skimming tank 57 comprises a first cylindrical section having a conical shaped top which is truncated by the lower terminus of inclined auger 59 and a second adjoining section 41 which has one wall 60 in common with a wall of the first section. The second section of the skimming tank is rectangular in cross-section and of a higher elevation than the first section. Within the second section there is an adjustable weir 58 which is sealed at the bottom and open at the top whereby water entering this section from the first section flows upwardly over the weir and out of the bottom of the second section through conduit 42. The height of the weir is adjusted so that floating polymer is forced into the lower terminus of auger 59. The second section is covered at the top with a loose fitting cover plate. Communication between the two sections is provided at the bottom of the common wall. Within the first section of the skimming tank there is provided a third cylindrical section 61 of smaller cross-section which encloses the slurry entry conduit 40. This section contains a diverter shield 63 and and has walls which extend upwardly to a level above the top of the opening between the first and second sections of the skimming tank.

Inclined auger 59 comprises a barrel 69 which encloses a continuous screw or auger 71 having a shaft 72 extending through and supported by the closed ends of said barrel. Rotation of the auger is provided by motor 73. As previously stated, the lower terminus of the auger assembly communicates with the top of the skimming tank. The upper terminus of the auger assembly communicates with outlet conduit 50.

The inclination of auger 59 from the horizontal can vary over a substantial range from as low as 10 degrees to as high as 30 degrees or higher. In general the lower limit of the inclination depends on the height of the liquid level in the auger and the upper inclination limit is a function of the carrying capacity of the auger, which usually falls off sharply above about 30 degrees.

Wet polymer solids fall through conduit 50 into drying zone 51 where they are completely dried. The dry polymer is thereafter usually passed to an extruder where it is formed into a marketable shape, such as pellets.

In operation, polymer slurry entering the skimming tank contacts diverter 63 whereby turbulence is reduced and passes upwardly through the third section 61 and enters the main section 57 of the skimming tank. The polymer solids being lighter than the water continue upwardly past window 65 and enter the lower terminus of auger 59. By virtue of the location of adjustable weir 58 the skimming tank is operated liquid full, ordinarily with the water extending into the lower terminus of the auger. Water which separates from the polymer passes from the main section 57 of the skimming tank into the adjacent section 41 wherein it flows upwardly over adjustable weir 58 and out through the bottom of section 41 through conduit 42. The polymer solids and water entering the auger are passed upwardly and exit from the upper terminus of the auger through conduit 50. Due to the inclination of the auger and the tumbling action of the polymer as it passes therethrough an additional amount of water is released from the polymer solids. This water flows downwardly through the auger and passes from the skimming tank through conduit 42, as previously described.

Stripping steam is admitted to auger 59 via conduit 76 and steam plus solvent is removed from the auger via conduit 77. The vapors in conduit 77 flow to condenser 78 wherein they are cooled and at least partially condensed. The resulting liquid is collected in knockout pot 80 and ultimately passed through conduit 82 to a phase separation zone for solvent recovery.

Uncondensed vapors in knockout pot 80 are withdrawn through conduit 83, vacuum regulator 84, and conduit 85 to steam ejector 86. Ejector 86 is operated by steam introduced in conduit 87 and this steam combined with vapors withdrawn from knockout pot 80 passes through conduit 88 and 76 in a recycle loop to auger 59. Thus a closed vapor system is defined by conduits 77, 83, 85, 88 and 76 with auger 59 and knockout pot 80 and there is no way for solvent vapors to escape and be lost. Ejector steam serves a double purpose by circulating the vapors through the auger 59 and stripping solvent from the solid matter.

Star valve 90 is provided to prevent flow of stripping gas through line 50.

Near the polymer inlet portion of auger 59, I have added a fluidizing chamber 70. FIGURE 2 shows this in cross section. The lower part 93 of barrel 69 is perforated at this point. Steam supplied by line 88 passes into the lower part of chamber 70, which serves as a plenum chamber, then through the perforations to fluidize the polymer. This provides more efficient contact with the stripping gas and results in more complete solvent removal. Valves 94 and 95 are provided to control steam flow. The division of steam flow depends upon many factors, of course, but generally about 10 to 50 percent of the total steam supplied is used to fluidize the polymer in the auger. Steam at a temperature below 260° F. can be used with range of 220 to 250° F. preferred. The total amount depends upon many factors but the range $\frac{1}{10}$ to $\frac{1}{2}$ pound of steam per pound of polymer is generally used. The range of $\frac{1}{8}$ to $\frac{1}{3}$ pound per pound is preferred.

The following example further illustrates my invention but it should not be considered unduly limiting.

*Example*

Apparatus as shown in the drawing was used in the recovery of polyethylene from a slurry thereof in water. Used was a 20-inch diameter auger with a length of twelve and one-half feet. It has an 18-inch pitch, is inclined at 20 degrees and rotates at 10 r.p.m. A number of runs were made in which 2000 to 4000 pounds per hour of polymer were treated. Polymer effluent contained 15 to 40 weight percent water and 0.5 to 1 weight percent hydrocarbon solvent (cyclohexane). Steam at 240° F. was supplied in an amount of 650 pounds per hour, 200 pounds per hour of which was used to fluidize the polymer. This removes 2,000 to 2,600 pounds per hour of cyclohexane from the polymer. If fluidizing is not used cyclohexane recovery is reduced by 25 to 35 pounds per hour.

The use of this invention thus reduces the load on the dryer and subsequent recovery of the hydrocarbon.

As many possible embodiments can be made of this invention without departing from the scope thereof, it is to be understood that all matter herein set forth is to be interpreted as illustrative and not as unduly limiting the invention.

I claim:

1. In a process wherein flotable solids are skimmed from a slurry of said solids in a liquid comprising a low boiling component, conveyed up an inclined surface, and contacted with an inert stripping gas introduced at the upper end portion of said inclined surface, said gas removed at the lower end portion of said inclined surface, the improvement comprising fluidizing said solids being conveyed up said inclined plane at a point between the inert gas introduction and removal by introducing a stripping gas at said point.

2. The process of claim 1 wherein said flotable solids are polyethylene particles.

3. The process of claim 1 wherein said inert stripping gas is steam.

References Cited in the file of this patent

UNITED STATES PATENTS 2,957,861     Goins _____ Oct. 25, 1960